(12) United States Patent
Bohn et al.

(10) Patent No.: US 12,144,465 B2
(45) Date of Patent: Nov. 19, 2024

(54) SPINNING DEVICE FOR DRYING FOODS

(71) Applicants: Carsten Bohn, Neuilly sur Seine (FR); Michel Paulo, Neuilly sur Seine (FR)

(72) Inventors: Carsten Bohn, Neuilly sur Seine (FR); Michel Paulo, Neuilly sur Seine (FR)

(73) Assignees: Carsten Bohn, Neuilly sur Seine (FR); Michel Paulo, Neuilly sur Seine (FR)

( * ) Notice: Subject to any disclaimer, the term of this patent is extended or adjusted under 35 U.S.C. 154(b) by 636 days.

(21) Appl. No.: 17/605,527

(22) PCT Filed: Jun. 3, 2019

(86) PCT No.: PCT/EP2019/064250
§ 371 (c)(1),
(2) Date: Oct. 21, 2021

(87) PCT Pub. No.: WO2020/244726
PCT Pub. Date: Dec. 10, 2020

(65) Prior Publication Data
US 2022/0202256 A1 Jun. 30, 2022

(51) Int. Cl.
A47J 43/24 (2006.01)
F26B 5/08 (2006.01)

(52) U.S. Cl.
CPC ............... A47J 43/24 (2013.01); F26B 5/08 (2013.01)

(58) Field of Classification Search
CPC ..................... A47J 43/24; F26B 5/08
USPC .......................................... 99/495
See application file for complete search history.

(56) References Cited

U.S. PATENT DOCUMENTS

| 6,018,883 | A | 2/2000 | Mulhauser |
| 7,448,315 | B2 * | 11/2008 | Mulhauser ............... A47J 43/24 99/511 |
| 2009/0114104 | A1 * | 5/2009 | Sawhney .................. F26B 5/08 494/84 |

FOREIGN PATENT DOCUMENTS

| EP | 2484254 A | 8/2012 |
| WO | 2020244726 A1 | 12/2020 |

OTHER PUBLICATIONS

Foreign Communication from a Related Counterpart Application, International Search Report and Written Opinion dated Feb. 19, 2020, International Application No. PCT/EP2019/064250 filed on Jun. 3, 2019.

* cited by examiner

Primary Examiner — Dana Ross
Assistant Examiner — Joseph W Iskra
(74) Attorney, Agent, or Firm — Conley Rose P.C.

(57) ABSTRACT

The invention proposes a spinning device for drying food comprising a container, a cover, an internal rotatable basket, a central drive assembly coupled to the basket for effecting rotation of the basket and including a handle structure linearly reciprocating between a raised position and a lowered position to rotate the basket, wherein the conversion mechanism retained against axial movement, the lid being releasably coupled to the basket and engageably coupled to the handle structure, and a brake assembly for reducing the rotational velocity and/or for stopping the rotation of the basket relative to the container, characterized in that the actuation of the brake assembly is effected by a rotation of the handle structure of the drive mechanism with respect to the cover of the container around the vertical axis (A) of rotation of the device.

12 Claims, 8 Drawing Sheets

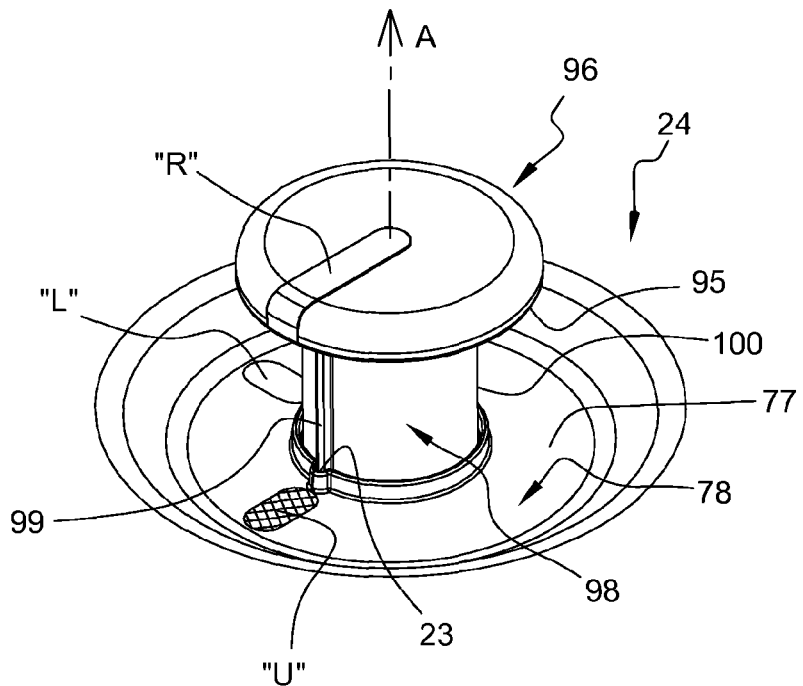
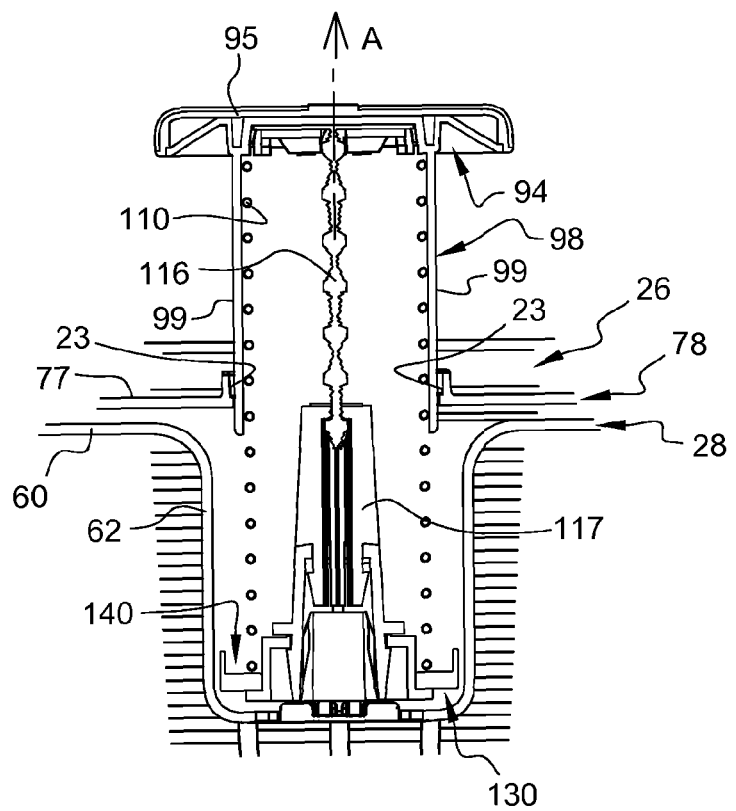

SPINNING DEVICE FOR DRYING FOODS

CROSS-REFERENCE TO RELATED APPLICATIONS

The present application is a filing under 35 U.S.C. 371 as the National Stage of International Application No. PCT/EP2019/064250, filed Jun. 3, 2019, entitled "A SPINNING DEVICE FOR DRYING FOODS," which is incorporated herein by reference in its entirety for all purposes.

BACKGROUND OF THE INVENTION

The present disclosure relates to a spinning device for drying wet food, such as a salad spinner, and more particularly to an integrated braking assembly system for reducing or stopping the rotation of the spinning device.

PRIOR ART

Various types of salad spinners are known for drying, or otherwise removing moisture, from salad and other foods.

Such devices generally include some type of an external bowl container, a cover and an internal basket, which may also have a lid, adapted to spin within the bowl by some type of mechanical actuator.

The centrifugal forces caused by the rotational velocity of the basket relative to the bowl, causes water and moisture within the food or salad to be separated and collected within the bowl. Mechanical actuators typically used on salad spinners have included hand crank mechanisms, pull strings and reciprocating nut and screw mechanisms, for example.

The general and basic design of a salad spinner including a reciprocating nut and screw driving mechanism has been disclosed in U.S. Pat. No. 5,992,309 (Incorporated herein by reference) comprising:
an open top container;
a cover substantially covering the open top of the container;
an internal basket disposed in the container and rotatable relative to the container about a central vertical axis of rotation;
a central drive assembly carried by the cover and coupled to the basket for effecting rotation of the basket, the drive assembly including a linearly reciprocating handle structure axially movable with respect to the cover between a raised position and a lowered position and a conversion mechanism for converting reciprocating movement of the handle structure to rotary motion of the basket, wherein the conversion mechanism includes a lid substantially retained against axial movement, the lid being releasably coupled to the basket and engageably coupled to the handle structure so that axial movement of the handle structure relative to the lid between the raised and lowered positions causes rotation of the lid and the basket;
a biasing structure for biasing the handle structure toward the raised position; and
a brake assembly for reducing the rotational velocity and/or for stopping the rotation of the basket relative to the container To prevent vertical movement of the reciprocating handle structure and to lock it in its lower storage position, this salad spinner includes a stop mechanism comprising a radially actionable latch supported by the bowl cover.

In Mulhauser U.S. Pat. No. 6,018,883 (Incorporated herein by reference) it has also been proposed to incorporate in such a salad spinner a brake assembly carried by the cover and engageable with the lid for frictionally stopping rotation of the basket assembly, including a moveable pad engageable with the lid.

Consequently, with a view to performing the various pumping-driving, braking and vertical stopping of the driving mechanism functions, it is necessary for the user to separately act on a pumping handle, a braking button and a radial latch.

It is a general object of the invention to provide an improved device for drying food which avoids the disadvantages of prior devices while affording additional structural and operating advantages and which can be used with ease and convenience.

In connection with the foregoing feature, a further feature of the invention is the provision of device of the type set forth, which can be operated with one hand while the bowl remains stationary in use.

An important feature of the invention is the provision of a device having a single actuator to rotate the basket relative to a bowl, to brake the rotation of the basket relative to the bowl and to vertically stop the pumping actuator in its lower storage position.

SUMMARY OF THE INVENTION

The invention proposes a spinning device for drying food comprising:
an open top container;
a cover substantially covering the open top of the container;
an internal basket disposed in the container and rotatable relative to the container about a central vertical axis of rotation;
a central drive assembly carried by the cover and coupled to the basket for effecting rotation of the basket, the drive assembly including a linearly reciprocating handle structure axially movable with respect to the cover between a raised position and a lowered position and a conversion mechanism for converting reciprocating movement of the handle structure to rotary motion of the basket, wherein the conversion mechanism includes a lid substantially retained against axial movement, the lid being releasably coupled to the basket and engageably coupled to the handle structure so that axial movement of the handle structure relative to the lid, between its raised and lowered positions, causes rotation of the lid and of the basket;
a biasing structure for biasing the handle structure toward the raised position; and
a brake assembly for reducing the rotational velocity and/or for stopping the rotation of the basket relative to the container,
characterized in that the actuation of the brake assembly is effected by a rotation of the handle structure of the drive mechanism with respect to the cover of the container around said vertical axis of rotation.

According to other features of the invention:
the actuation of the brake assembly is effected by a rotation of the handle structure of the drive mechanism when the handle structure is in its lowered position;
the handle structure is rotatably mounted with respect to the said cover between an angular driving position and at least one angular braking position;
the said at least one angular braking position is arranged between said angular driving position and an angular stop position in which the handle structure is axially locked with respect to the cover in its lowered position;

the handle structure includes an upper button structure and a lower coaxial cylindrical sidewall, the outer surface of the sidewall has an axial rib for axially guiding the handle structure with respect to the cover during said axial reciprocating movement, a notch is formed in said axial rib having a height which is at least substantially equal to the thickness of the upper surface portion of the cover in which a central hole for the passage of the sidewall is formed and, when the handle structure is in its lowered position, said notch is facing the upper surface portion of the cover for permitting a rotation of the sidewall of the handle structure of the drive mechanism with respect to the cover of the container;

when the handle structure is in its lowered position, and when the handle structure is out of said angular driving position, the upper edge of said rib is bearing against a facing portion of the under face of the upper surface portion of the cover under the action of said biasing structure;

the handle structure includes an upper button structure and a lower coaxial cylindrical sidewall, the conversion mechanism includes a pit shaped central core of said lid which axially extends around said sidewall, and the braking assembly comprises a frictional braking component supported by said cover and which is actuated by the rotation of the handle structure for frictionally engaging an associated facing portion of the inner face of said central core;

said frictional component comprises a frictional portion which is elastically deformable between a radially internal rest position and a radially external active position in which it frictionally engages a facing concave cylindrical portion of the inner face of the central core;

said frictional component is arranged around a lower end of the said sidewall;

the deformable frictional portion of the frictional element is an arcuate band portion which angularly extends around the central axis and which has an internal actuation surface, and the said sidewall includes an actuation finger which, when handle structure is in its lowered position and is rotated with respect to the container, cooperates with said internal actuation surface of the deformable frictional portion;

said arcuate band portion is a portion of an elastomeric or rubber ring element supported at a lower end of an axial extension of the cover surrounding the said sidewall;

the biasing structure is a compressed helical spring.

BRIEF DESCRIPTION OF THE DRAWINGS

FIG. 12 is an enlarged view of the central portion of a top perspective view of the device for drying food of the present invention, with the handle in its raised and angularly unlocked position; and FIG. 13 is a view similar to the view of FIG. 3, illustrating in detail the central drive assembly when the handle in its raised and angularly unlocked position of FIG. 12.

DETAILED DESCRIPTION OF THE PREFERRED EMBODIMENT

For the description of the invention and the understanding of the claims, the vertical, longitudinal and transverse orientations according to reference mark V, L, T indicated in FIGS. (Whose longitudinal axe L and transverse axe T extend in a horizontal plane) shall be adopted as non-limiting and without reference to earth gravity.

In the following description, identical, similar or analogous elements or components will be referred to by the same numeral references.

Figure 1:
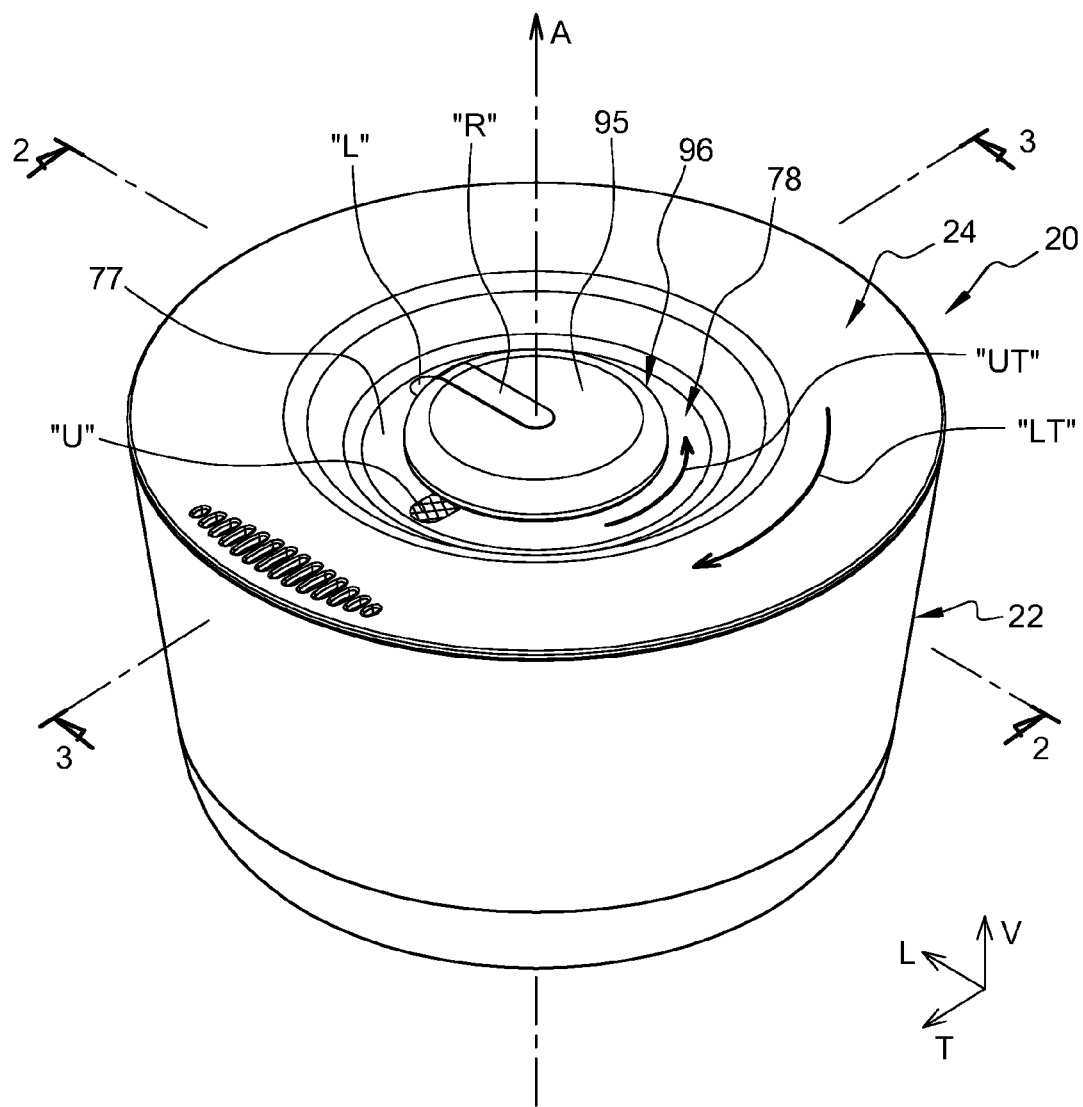
FIG. 1 is a top perspective view of the device for drying food of the present invention, with the handle in its lowered and angularly locked position.
Figure 2:
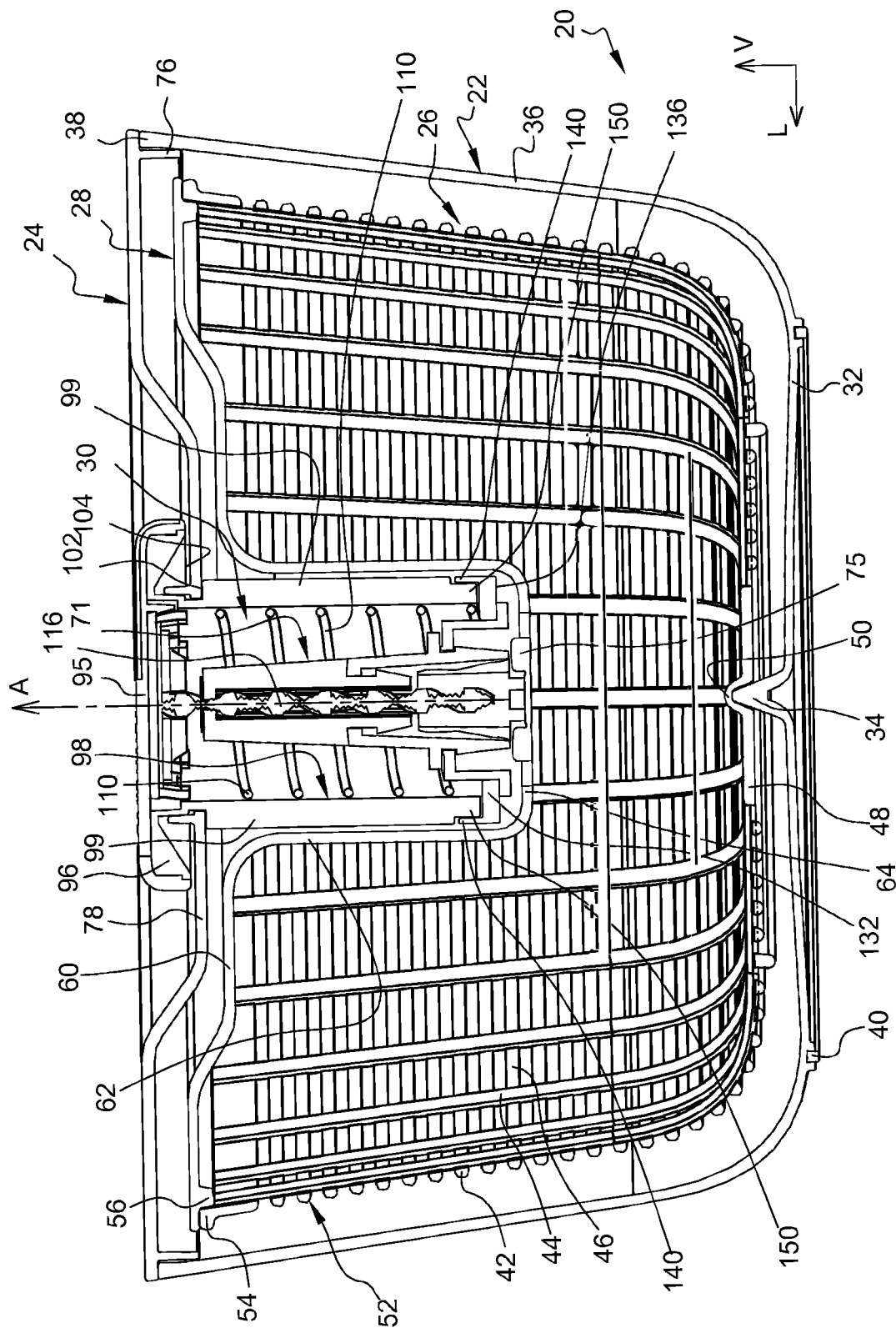
FIG. 2 is a longitudinal and vertical sectional view taken generally along lines 2-2 of FIG. 1.

Referring to FIGS. 1 and 2, a device for drying food, such as a salad spinner 20, is provided.

The salad spinner 20 generally includes an external open top container in the form of a bowl 22, a cover 24 for the bowl 22, an internal perforated basket 26 disposed in the bowl 22, a lid 28 for the basket 26 and a drive assembly 30 for rotating the perforated basket 26.

The bowl 22 is circular in shape and, as seen in FIG. 2, has a central vertical axis A and a bottom wall 32 having a cone-shaped projection 34 in its center. The bowl 22 also includes a sidewall 36 terminating in a top edge 38 and an annular foot 40 connected to the bottom wall 32 and preferably made of a non-slip material.

The basket 26, as best seen in FIG. 2, includes a plurality of latitudinal, coaxial circular horizontal ribs 42 connected by a plurality of vertical ribs 44. The ribs 42 and 44 cooperate to define a plurality of various sized, generally rectangular apertures 46. The basket 26, as seen in FIG. 2, also includes a bottom 48 having a cone-shaped projection 50 at its center which sits atop cone-shaped projection 34 to form a rotational bearing.

The ribs 42 and 44 together form a sidewall 52 terminating at an upper edge 54.

The lid 28, as best seen in FIG. 2 includes a cylindrical peripheral sidewall 56 projecting downwardly therefrom. The sidewall 56 cooperate to provide a friction fit with the upper edge 54 of the basket 26.

The lid 28 includes a convex annular horizontal surface portion 60 connected to the circular sidewall 56, a frustoconical shaped central portion 62 depending from the annular surface portion 60, a radially inwardly extending bottom surface portion 64 integral with the lower end of the frustoconical shaped surface portion 62 and a tubular, upwardly projecting portion 66 integral and coaxial with the bottom surface portion 64.

The frustoconical shaped surface portion 62 is delimited by an internal concave frustoconical surface 63.

The upwardly projecting portion 66 has an external axially grooved profile 68 which is received and interlocked in the internal complementary axially grooved profile 69 formed in the lower part 70, of a nut element 71.

Figure 3:
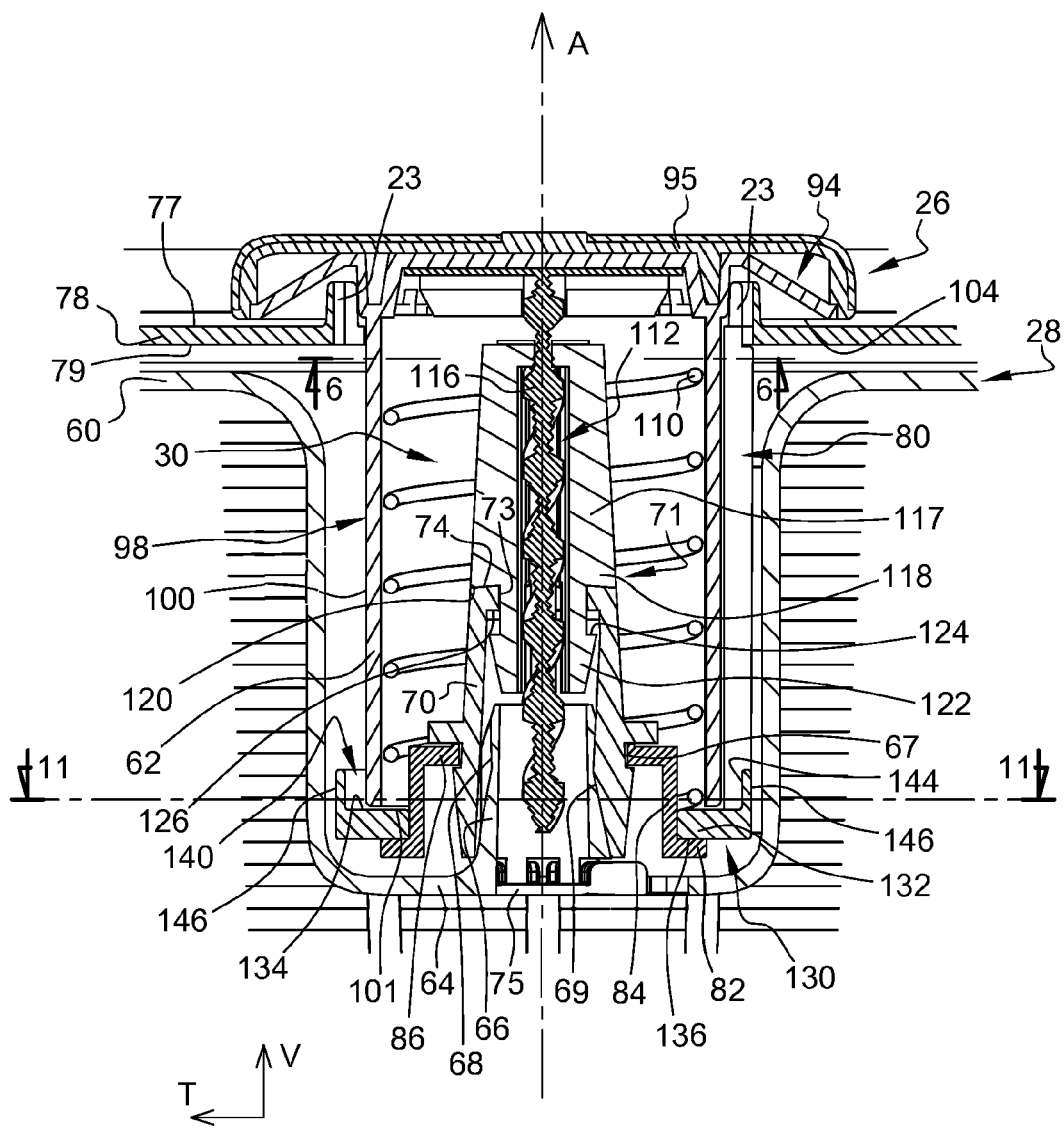
FIG. 3 is an enlarged transversal and vertical sectional view taken generally along lines 3-3 of FIG. 1, illustrating in detail the central drive assembly.

Referring to FIGS. 2 and 3, the upwardly projecting lower part 70 has a terminal open end 73 having inclined teeth surfaces 74 forming, as discussed below, a portion of the drive assembly 30.

Referring to FIG. 2, a plug 75 closes the lower end of the upwardly projecting portion 66 to prevent food from entering the interior thereof.

As seen in FIG. 2, the cover 24 includes a cylindrical sidewall 76 having a downwardly extending outer diameter substantially equal to the inner diameter of the top edge 38 of the bowl 22 thereby forming a coaxial fit therebetween.

The cover 24 also has an upper surface portion 78, a depending, substantially cylindrical central surface portion 80, an annular bottom surface portion 82 and a generally cylindrical upwardly projecting portion 84 disposable coaxially about a portion of the upwardly projecting portion 66 of the lid 28. The upwardly projecting portion 84 has a radially internal end 86 at its upper end which is received in a radial groove 67 of the upwardly projecting portion 66.

Figure 4:
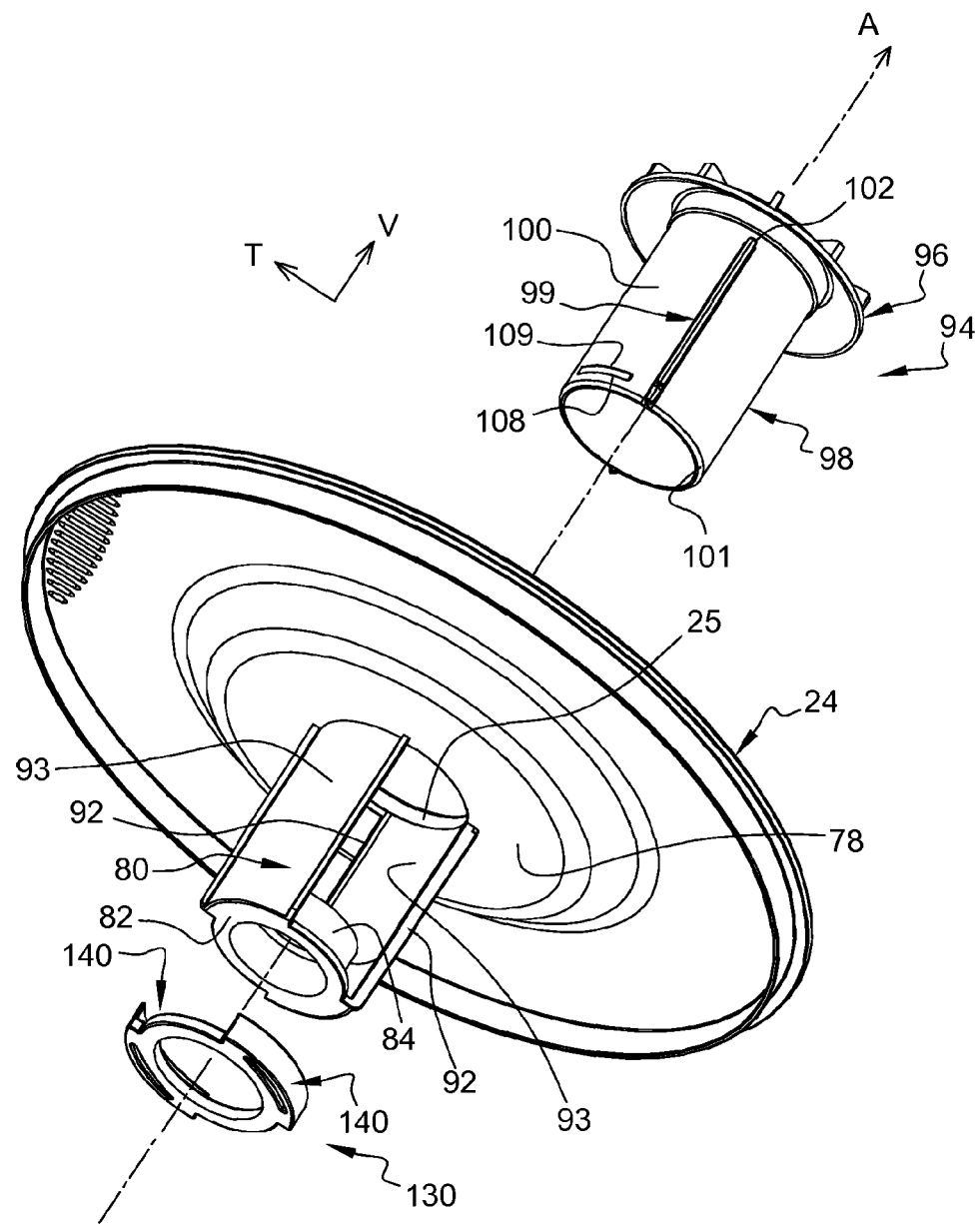
FIG. 4 is a fragmentary exploded under perspective view illustrating in detail the main component of the handle structure, the bowl cover and the braking frictional component.

As best seen in FIG. 4, the cylindrical surface portion 80, includes two vertical slots 92 disposed about 180 degrees apart and running the majority of the axial height of the cylindrical surface portion 80.

Each slot 92 substantially extends angularly about 90 degrees and thus, the cylindrical surface portion 80 is in the form of two diametrically opposed vertical extensions, each of which extends angularly about 90 degrees.

Referring to FIGS. 2, 3 AND 4, the drive assembly 30 includes a linearly reciprocating handle structure 94 (or plunger assembly) moveable along a vertical central axis A.

The reciprocating handle structure 94 includes a disc shaped upper end 96, or button structure, and a coaxial cylindrical lower sidewall 98 depending therefrom.

The button structure 96 is provided with a decorative cover 95 comprising a radial and rotating marking "R" for indicating the angular position of the handle structure 94 about the central axis A.

The cylindrical sidewall 98 is received in the frustoconical shaped central portion 62 and is surrounded by its internal surface 63.

The cylindrical sidewall 98 has two diametrically opposed ribs 99. Each rib 99 extends vertically along the external convex cylindrical surface 100.

Each rib extends vertically from the lower circular edge 101 of the sidewall 98 up to a horizontal upper edge 102.

Figure 5:
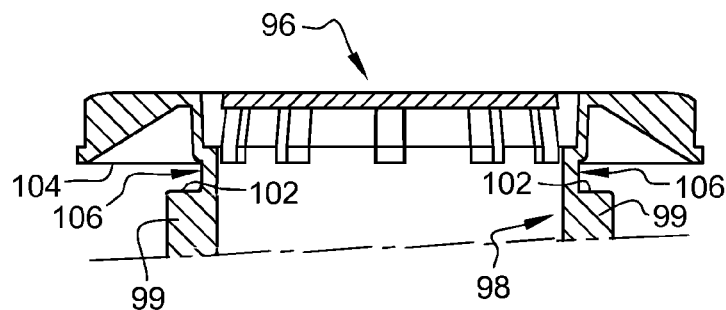
FIG. 5 is a detailed enlarged view of the upper button structure of the handle structure of FIG. 2.
Figure 6:
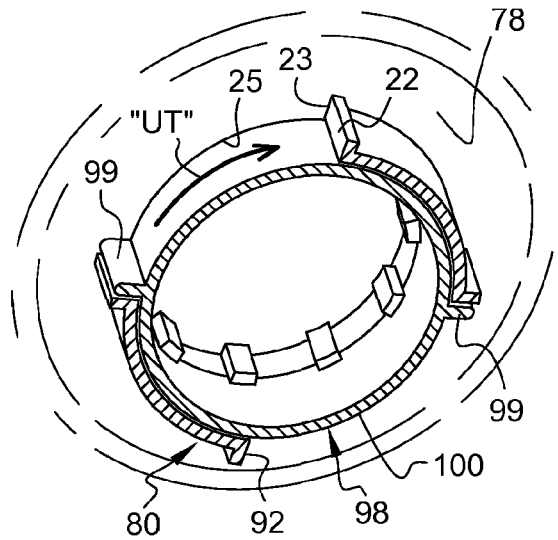
FIG. 6 is a partial under perspective view showing the cooperation between the lower sidewall of the handle structure and the lower central extension of the cover, in section along lines 6-6 of FIG. 3.

As it can be best seen when referring to FIGS. 2 and 5, the upper horizontal edges 102 extend facing the horizontal lower edge 104 of the upper button structure 96, thereby defining a radial notch 106.

Referring to FIG. 2 and FIG. 5, it can be seen that the height of each notch 106 is slightly higher than the axial thickness of the upper surface portion 78 of the cover 24 with a view to permitting a rotation of the handle structure 94 relative to the cover 24.

The other function of the external axial ribs 99 is to axially guide the handle structure 94 with respect to the cover 24. To this end, the upper surface portion 78 of the cover 24 comprises a central circular hole 25 through which the sidewall 98 slidably extends and is slidably received.

The central hole 25 comprises two diametrically opposed axial grooves 23 for permitting the axial passage of the ribs 99 when the handle structure 96 is in its active angular position with respect to the cover 24 (See FIGS. 12 and 13).

At its lower end, the external convex cylindrical surface 100 of the sidewall 98 is provided with two, diametrically opposed and horizontally aligned, radially outwardly extending projections 108 each forming a shoulder surface 109 which, in cooperation with the underside face 79 of the upper surface portion 78 of the cover 24, determine the upper position (Illustrated at FIGS. 12 and 13) of the handle structure 94 with respect to the cover 24.

The handle structure 94 is elastically returned towards this upper position by a helical compression spring 110 which is axially interposed and permanently compressed between an internal abutment surface of the button structure 96 of the handle structure 94 and, indirectly against the annular bottom surface portion 82.

Referring to FIGS. 2 and 3, the drive assembly 30 also includes a conversion mechanism 112 for converting the reciprocating movement of the handle structure 94 to rotary motion of the basket 26.

The conversion mechanism 112 includes an elongated helical screw shaft 116 coaxial with the handle structure 94 and connected at one end to the disc shaped upper end 96). The elongated helical shaft 116 extends a slight distance below the lower end 101 of the cylindrical sidewall 98.

Referring to FIGS. 2 and 3, the conversion mechanism 112 also includes an upper part 117, of the two parts nut 71. The upper part 117 receives the helical shaft 116 therethrough for screw-type engagement therewith.

As seen in FIGS. 2 and 3, the upper part 117 of the nut 71 also includes a lower shoulder 118 having a plurality of inclined teeth surfaces 120 which are complementary of the inclined teeth surfaces 74 of the upwardly projecting portion 66 of the basket lid 28.

As seen in FIG. 3, the upper part 116 of the nut 71 also includes a central lower core 122 having a top internal shoulder 124. The shoulder 124 faces an internal shoulder 126 of the lower part 70 of the nut 71.

As discussed below, the cap cooperation of the shoulders 124 and 126 limits the relative axial movement of the upper element 117 with respect to the lower part 70 of the nut 71.

Referring to FIGS. 2 and 3, the drive assembly 30 works as follows. FIGS. 2 and 3 illustrate the conversion mechanism 112 in an engaged lower condition where the teeth surfaces 120 and 74 of the upper and lower nut parts 116 and 70 are engaged axially against the elastic action exerted by the return spring 110.

When a downward force is applied to the disc shaped upper button portion 96 of the reciprocating handle structure 94, the reciprocating handle structure 94, the attached helical shaft 116 and the upper nut part 117 initially move together axially downwardly so that the engaging teeth surfaces 120 are in contact with the associated engaging teeth surfaces 74 of the lid 28.

Continuing application of force in the same direction causes the helical shaft 116 to axially move through the upper part 117 of the nut 71 to rotate the nut 71. This causes rotation of the lid 28, and of the perforated basket 26 coupled thereto, about the vertical axis A.

The reciprocating handle structure 94 may be plunged down until the disc shaped upper end 96 contacts the top of the cylindrical surface portion 80 of the cover 24.

When force is no longer applied, the return spring 110 causes the reciprocating handle structure 94, the helical shaft 116 and the upper nut part 117 to initially move axially upwardly together until the shoulder 124 contacts the shoulder 126.

The conversion mechanism 112 is thus again in its disengaged condition. However, the helical shaft 117 and the reciprocating handle structure 94 continue to move axially upward back to its upper position (See FIGS. 12 and 13). During this axial movement, the helical shaft 116 moves through the upper nut part 117 of the nut 71 causing it to rotate.

Repeated plunging motions may be applied, as necessary, to rotate the basket 26 in which wet or washed food is placed. The rotation of the perforated basket 26 causes the liquid on the food to be sent out of the perforated basket 26 through apertures 46 by centrifugal force into the bowl 22, thereby drying the food in the basket.

Referring to FIG. 1, with a view to permitting a visual and simple identification, by the user of the device 22, of the angular position of the handle structure with respect to the cover 24, the decorative cover 95 of the button structure 96 is provided with a radial marking index "R" which is rotating with the button structure around the central vertical axis.

The upper face 77 of the upper surface portion 78 of the lid is provided with two radial markings "L" and "U" which are adjacent to the periphery of the button structure.

In a non-limiting manner, and due to the angular dimensioning and positioning of the grooves 92, the two markings L and U are separated by 90 degrees.

The L marking corresponding to the angular locking or locked position of the handle structure 94 can be colored in red, and the U marking corresponding to the angular unlocking or unlocked position of the handle structure 94 can be colored in green.

This latter unlocked U position is the angular driving position of the handle structure in which the latter can move in a vertical reciprocating movement with respect to the container (See FIGS. 12 and 13).

Starting from the locked position illustrated at FIG. 1, the user must rotate the button structure 96 for an anticlockwise angular unlocking travel "UT" until reaching the angular alignment of the rotating mark R with the U marking in order to obtain the unlocking of the handle structure 94 and to permit its upwards movement under the action of the compressed return spring 110.

Starting from this latter upper position of the handle structure 94 illustrated at FIGS. 12 and 13, the user may apply a downward force on the button structure 96 until the axial alignment of the notches 106 with the surface portion 78 of the cover 24, thus permitting thereafter a clockwise angular locking travel "LT" of the handle structure, to reach again the L marked locked position.

Thus, the design according to the invention provides a kind of a bayonet-type locking system, with the handle structure 94 locked vertically in the lowered position, while still being able to be rotated around the central and vertical axis A from the angular unlocked position towards an angular position of locking the handle structure 94 in the vertical lowered position.

According to the invention, the device 20 is provided with a brake assembly for reducing the rotational velocity and/or for stopping the rotation of the basket relative to the bowl 26 which is actuated by a rotation of the handle structure of the drive mechanism with respect to the container or bowl 26 the vertical axis A.

According to the illustrated embodiment, the actuation of the brake assembly is effected by a rotation of the handle structure of the drive mechanism when the handle structure is in its lowered position.

To this end, the lower portion of the two diametrically opposed vertical extensions 93 of the central surface portion 80, together with the annular bottom surface portion 82 and the projecting portion 84 support a braking ring 130 which is made of an elastically deformable material such as rubber or elastomer.

The ring 130 comprises a base annular portion 132 which is delimited by a central hole 134, a flat bottom face 136, a flat top face 138, and a cylindrical outer side face 139.

The dimensions of the base portion 132 are such that the elastic ring 130 is mounted by fitting inside the central surface portion 80, centered around the central projecting portion 84 and supported by its lower face 136 bearing on the upper face of the annular bottom surface portion 82.

The ring 130 comprises two diametrically opposed extensions 140, each of them being a frictional breaking component in the sense of the invention.

Each extension 140 is in the form of an arcuate band portion which extends angularly around the cylindrical outer side face 140 of the base portion 132.

Each extension 140 extends about 90 degrees and is radially offset so as to be located in one associated window 92 and extending beyond the periphery of the annular bottom surface portion 82.

Each extension 140 is connected to the base portion 132 by two end connecting tabs 142.

Each band shaped extension 140 extends vertically above the plane of flat top face 138 and is delimited by a radially internal actuation surface 144 and a radially external braking or frictional surface 146.

Figure 7:
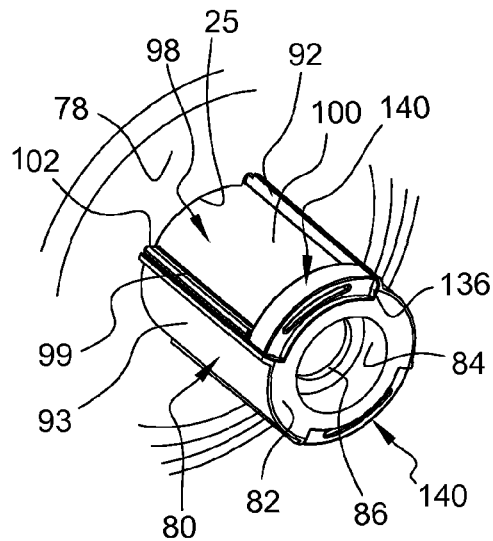
FIG. 7 is an under perspective view of the components shown at FIG. 4 which are illustrated in their assembled position of FIGS. 1 and 3.
Figure 8:
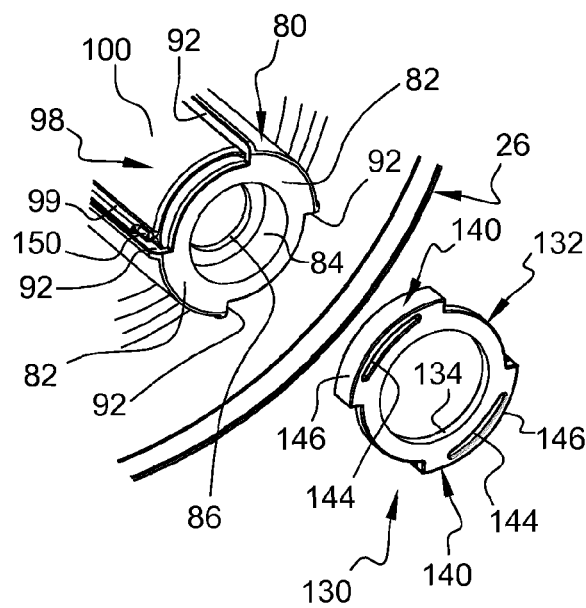
FIG. 8 is a view similar to the view of FIG. 7 illustrating the braking frictional component as exploded.

The braking surface 146 is substantially circular and, when the brake assembly is not actuated, extends substantially parallel to the internal concave surface 63 of the frustoconical shaped surface portion 62 and with a radial gap therebetween (See FIG. 7).

The radial thickness of each band shaped extension 140 is not constant and the internal actuation surface 144 is not parallel to the breaking surface 146.

Substantially at its mid-length each extension 140 has its greater radial thickness "rth".

In order to act on each frictional breaking extension 140, the lower end of each rib 99 of the sidewall 98 has a reduced radial dimension so that it is shaped into a vertical actuation finger 150.

Figure 9:
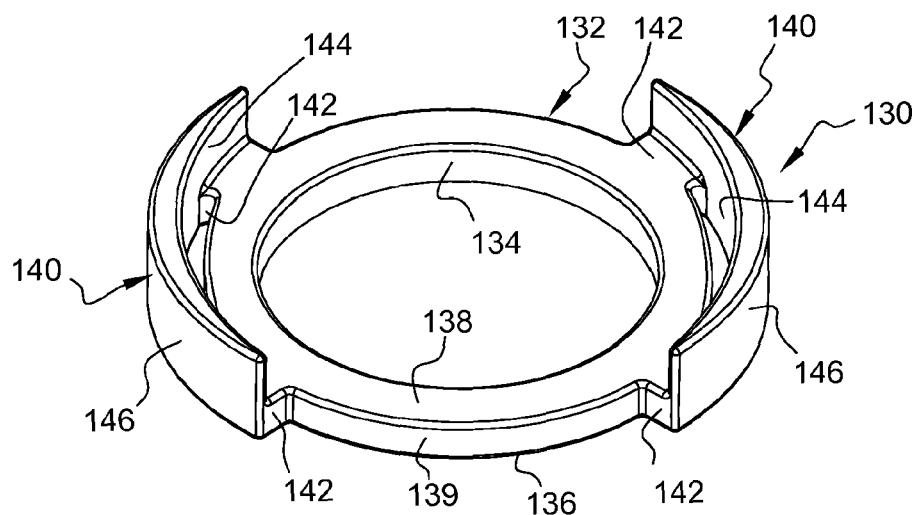
FIG. 9 is an enlarged upper perspective view of the braking frictional component.
Figure 10:
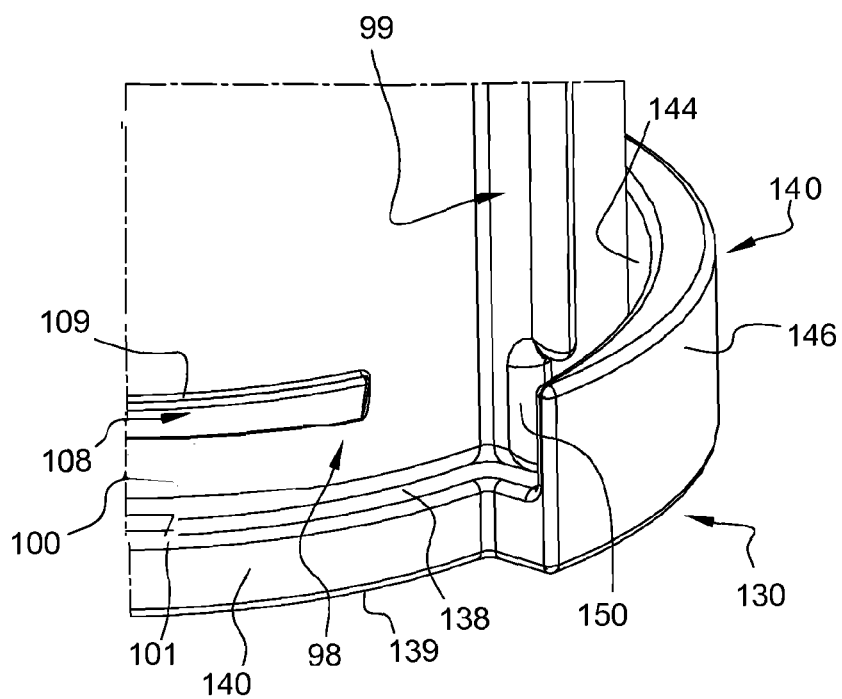
FIG. 10 is an enlarged detail view of the lower part of FIG. 7 illustrating the cooperation of the actuation finger of the handle structure with the actuating inner surface of the braking frictional component.
Figure 11:
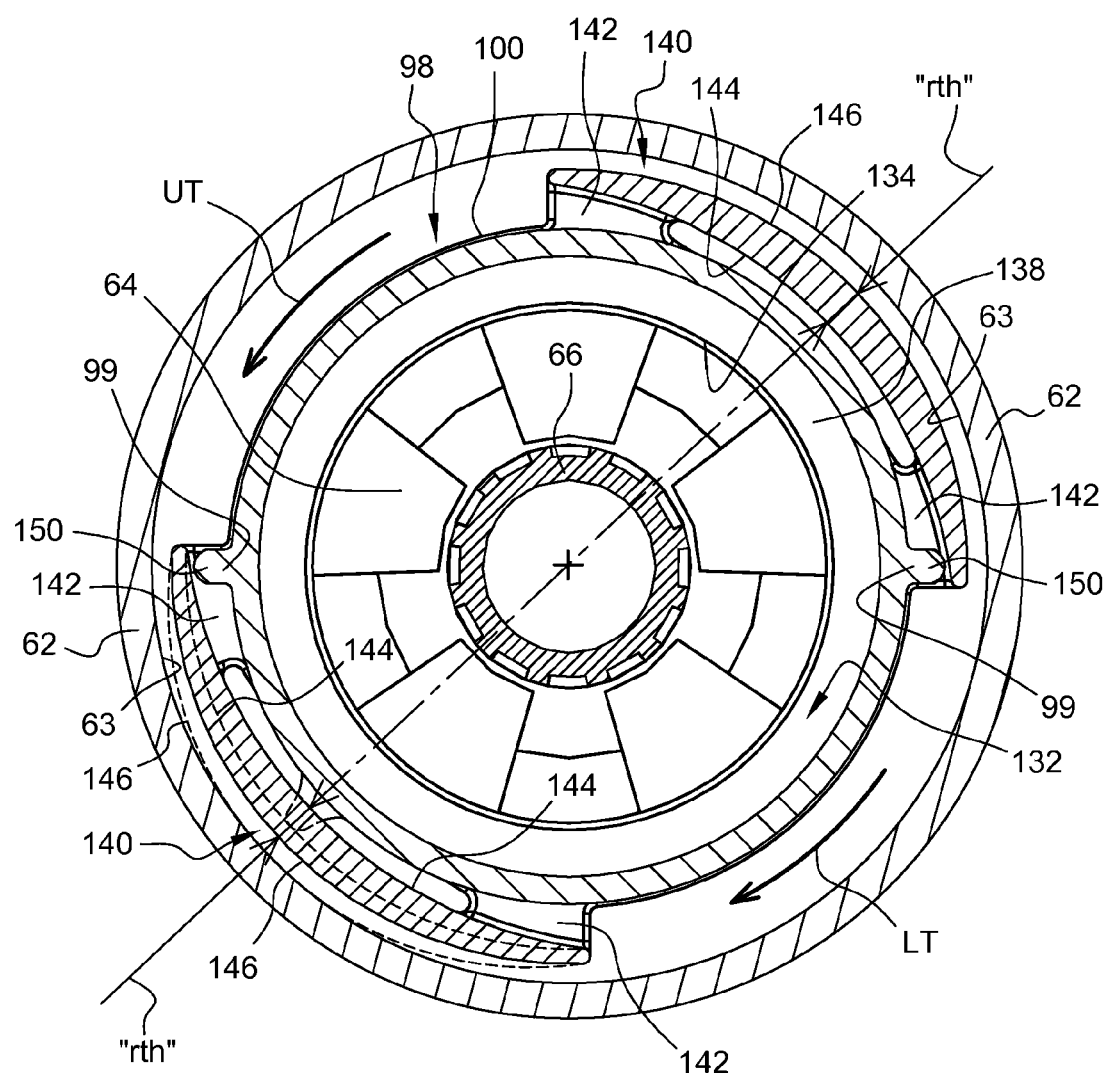
FIG. 11 is an enlarged horizontal sectional view taken generally along lines 11-11 of FIG. 3, illustrating in detail the arrangement of the three components of FIG. 7.

Referring to FIGS. 2, 9 and 11, it can be seen that each actuation finger 150 is received behind the actuation surface 144 in contact therewith.

Thus, during the entire relative angular locking travel LT between the handle structure 94 and the cover 24 as described above (i.e. between the unlocked U position and the locked L position), the actuation finger 50 will move along the actuation surface 144 and cooperate therewith to act on the breaking band shaped extension 140 to deform it radially to gradually bring its braking surface 146 into contact with the facing portion of the surface 63 with an increasing radial clamping force.

Referring to FIG. 11, it has been represented in dotted lines—for one of the two band shaped extensions 140—the position of the actuation finger 150 at mid-travel between the two angular extreme positions and the deformed shape of the extension which corresponds to the maximum radial clamping force of the band 140 between the actuation finger 150 and the internal concave surface 63.

The invention claimed is:

1. A spinning device for drying food comprising:
an open top container;
a cover substantially covering the open top of the container;
an internal basket disposed in the container and rotatable relative to the container about a central vertical axis (A) of rotation;
a central drive assembly carried by the cover and coupled to the basket for effecting rotation of the basket, the drive assembly including a linearly reciprocating handle structure axially movable with respect to the cover between a raised position and a lowered position and a conversion mechanism for converting reciprocating movement of the handle structure to rotary motion of the basket,
wherein the conversion mechanism includes a lid substantially retained against axial movement, the lid being releasably coupled to the basket and engageably coupled to the handle structure so that axial movement of the handle structure relative to the lid, between its raised and lowered positions, causes rotation of the lid and of the basket;
a biasing structure for biasing the handle structure toward the raised position; and
a brake assembly for reducing the rotational velocity and/or for stopping the rotation of the basket relative to the container, characterized in that the actuation of the brake assembly is effected by a rotation of the handle structure of the drive mechanism with respect to the cover of the container around said vertical axis (A) of rotation.

2. A spinning device according to claim 1, wherein the actuation of the brake assembly is effected by a rotation of the handle structure of the drive mechanism when the handle structure is in its lowered position.

3. A spinning device according to claim 1, wherein the handle structure is rotatably mounted with respect to the said cover between an angular driving (U) position and at least one angular braking position.

4. A spinning device according to claim 3, wherein the said at least one angular braking position is arranged between said angular driving position (U) and an angular stop position (L) in which the handle structure is axially locked with respect to the cover in its lowered position.

5. A spinning device according to claim 1, wherein:
the handle structure includes an upper button structure and a lower coaxial cylindrical sidewall;
the outer surface of the sidewall has an axial rib for axially guiding the handle structure with respect to the cover during said axial reciprocating movement;
a notch is formed in said axial rib having a height which is at least substantially equal to the thickness of the upper surface portion of the cover in which a central hole for the passage of the sidewall is formed;
and wherein, when the handle structure is in its lowered position, said notch is facing the upper surface portion of the cover for permitting a rotation of the sidewall of the handle structure of the drive mechanism with respect to the cover of the container.

6. A spinning device according to claim 5, wherein at least one of: (a) the handle structure is rotatably mounted with respect to the said cover between an angular driving (U) position and at least one angular braking position, or (b) the said at least one angular braking position is arranged between said angular driving position (U) and an angular stop position (L) in which the handle structure is axially locked with respect to the cover in its lowered position, and wherein when the handle structure is in its lowered position, and when the handle structure is out of said angular driving position (U), the upper edge of said rib is bearing against a facing portion of the under face of the upper surface portion of the cover under the action of said biasing structure.

7. A spinning device according to claim 1, wherein:
the handle structure includes an upper button structure and a lower coaxial cylindrical sidewall;
the conversion mechanism includes a pit shaped central core of said lid which axially extends around said sidewall;
the braking assembly comprises a frictional braking component supported by said cover and which is actuated by the rotation of the handle structure for frictionally engaging an associated facing portion of the inner face of said central core.

8. A spinning device according to claim 7, wherein said frictional component comprises a frictional portion which is elastically deformable between a radially internal rest position and a radially external active position in which it frictionally engages a facing concave cylindrical portion of the inner face of the central core.

9. A spinning device according to claim 7, wherein said frictional component is arranged around a lower end of the said sidewall.

10. A spinning device according to claim 7, wherein
the deformable frictional portion of the frictional element is an arcuate band portion which angularly extends around the central axis (A) and which has an internal actuation surface; and
the said sidewall includes an actuation finger which, when handle structure is in its lowered position and is rotated with respect to the container, cooperates with said internal actuation surface of the deformable frictional portion.

11. A spinning device according to claim 10, wherein said arcuate band portion is a portion of an elastomeric or rubber ring element supported at a lower end of an axial extension of the cover surrounding the said sidewall.

12. A spinning device according to claim 1, wherein said biasing structure is a compressed helical spring.

* * * * *